Figure 1:
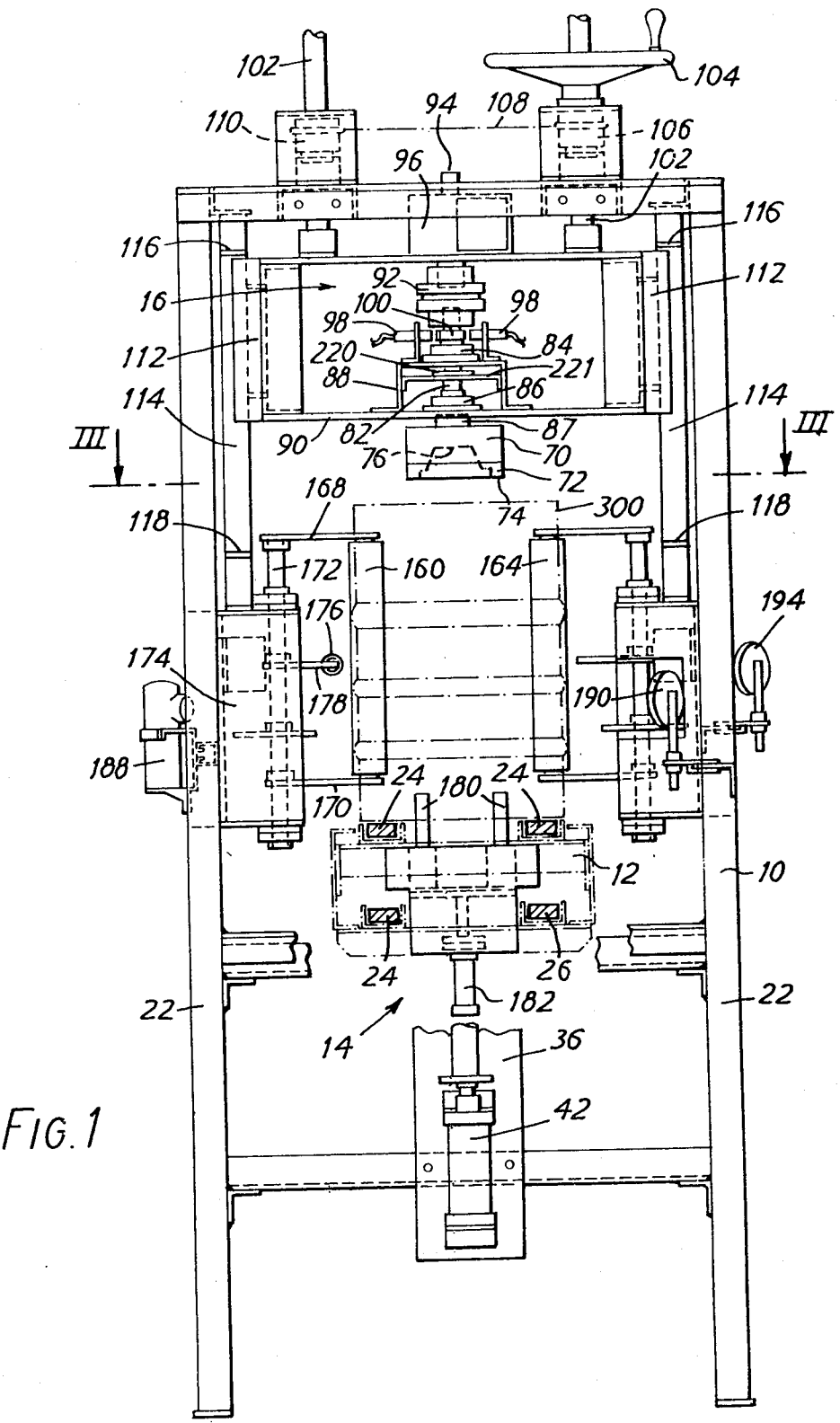

United States Patent [19]

Avey

[11] 4,453,314

[45] Jun. 12, 1984

[54] APPARATUS FOR INSPECTING THE CHIMBS OF CYLINDRICAL ARTICLES SUCH AS KEGS

[75] Inventor: Kenneth F.C. Avey, Epping, England

[73] Assignee: The British Mathews, Limited, Essex, England

[21] Appl. No.: 363,277

[22] Filed: Mar. 29, 1982

[30] Foreign Application Priority Data

Mar. 10, 1982 [GB] United Kingdom ............... 8206970

[51] Int. Cl.³ .......................... G01B 7/28; B07C 5/08
[52] U.S. Cl. .............................. 33/178 E; 33/174 L; 209/531; 209/604
[58] Field of Search ............ 33/174 L, 174 Q, 178 E; 209/531, 533, 601, 602, 604, 912

[56] References Cited

U.S. PATENT DOCUMENTS

| | | | |
|---|---|---|---|
| 2,338,868 | 1/1944 | Owens | 33/178 E |
| 2,355,719 | 8/1944 | Fedorchak | 33/178 E |
| 2,687,454 | 8/1954 | Hall | 33/178 E |
| 2,689,409 | 9/1954 | Fry et al. | 33/178 E |
| 3,073,034 | 1/1963 | Antoszewski | 33/174 L |
| 3,273,710 | 9/1966 | Early et al. | 209/531 |
| 3,420,369 | 1/1969 | Sorbie | 209/604 |
| 3,814,241 | 6/1974 | Stein | 33/174 L |
| 3,819,047 | 6/1974 | Sorbie | 209/602 |
| 3,879,993 | 4/1975 | Sorbie | 33/174 Q |
| 4,347,667 | 9/1982 | Albertazzi | 33/174 L |

FOREIGN PATENT DOCUMENTS

| | | |
|---|---|---|
| 26621 | 8/1981 | European Pat. Off. |
| 797157 | 6/1958 | United Kingdom. |
| 860444 | 2/1961 | United Kingdom. |
| 1029886 | 5/1966 | United Kingdom. |

Primary Examiner—Richard R. Stearns
Attorney, Agent, or Firm—Salter & Michaelson

[57] ABSTRACT

Apparatus for inspecting the chimbs of cylindrical articles such as kegs or drums comprises means for rotating a keg about its cylindrical axis and sensing means arranged to engage the chimb of the keg and to sense displacement of the chimb from a predetermined position. In the preferred embodiment, a lower sensing unit 18 has two actuating arms 132 and 232 pivoted about horizontal axes. Each arm has at one end a roller (136,236) which engages the chimb 302 of a keg 300 under the resilient bias of a spring (154,254). At the other end the arm has a steel plate (138,238) moving over a proximity sensor (152,252). Deformation of chimb 302 at any point in its circumference causes the plate on one or other arm to move away from the proximity sensor which gives an appropriate signal to electrical control circuitry of the apparatus. An upper sensing unit 20 is provided so that the upper and lower chimbs of a keg can be inspected simultaneously. The keg 300 is clamped between rotatable lower and upper hubs 30 and 70, and one of the hubs is driven to rotate the keg. The lower hub 30 is movable vertically to lift each keg from a conveyor 12 and re-deposit it on the conveyor after inspection, so that the apparatus can be installed in a conveyor line on which the kegs travel. Kegs for which the apparatus indicates a damaged chimb may be diverted from the conveyor line downstream of the apparatus.

6 Claims, 8 Drawing Figures

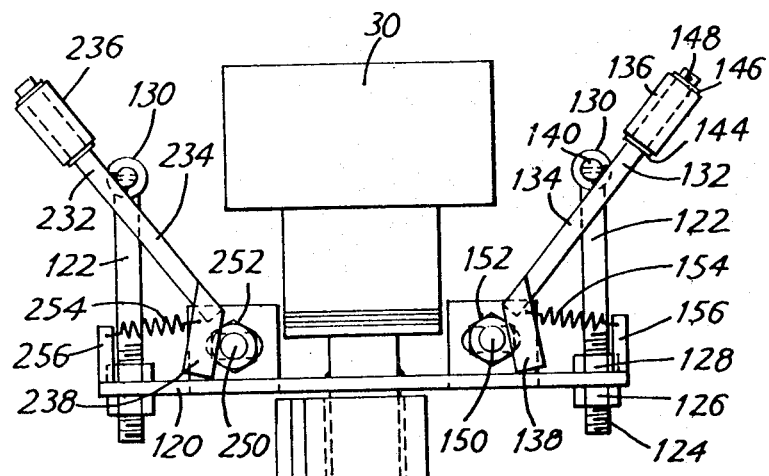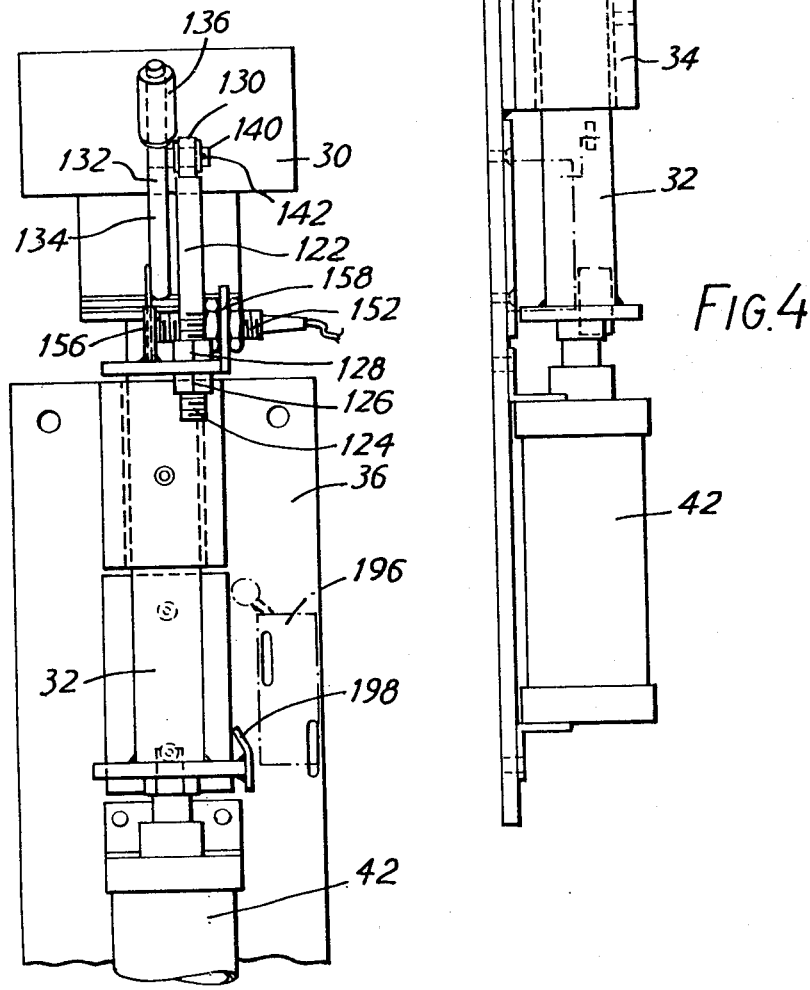

APPARATUS FOR INSPECTING THE CHIMBS OF CYLINDRICAL ARTICLES SUCH AS KEGS

This invention relates to apparatus for inspecting the chimbs of cylindrical articles such as kegs.

Kegs or drums of metal such as aluminum are widely used to transport liquids. In handling such kegs or drums, the chimbs or projecting rims of the kegs or drums can be damaged, in particular by being bent inwardly. Such deformation of the chimb can cause problems in handling the kegs or drums. It is therefore advantageous to inspect the chimbs at regular intervals, for example when empty kegs or drums are returned to a filling plant. There is a need for apparatus which will enable such an inspection to be carried out automatically in a continuous process.

This invention consists in apparatus for inspecting the chimbs of cylindrical articles such as kegs, comprising means for supporting such an article, sensing means having at least one sensing element arranged to engage a chimb of the article at a point in its circumference and adapted to detect a displacement of the chimb at that point from a predetermined position, and drive means for effecting relative rotation about the axis of the article between the article and the sensing means so that each point on the circumference of the chimb passes the sensing element or one of the sensing elements during the rotation.

Preferably, two sensing means are provided, arranged simultaneously to engage respective chimbs at opposite ends of the article. The sensing means may include two sensing elements arranged to engage diametrically opposite points on the chimb, the drive means effecting relative rotation of the article through 180°.

Suitably, each sensing element comprises a pivoted arm, resilient biasing means for biasing one end of the arm into engagement with a chimb of the article, and means for sensing angular displacement of the arm from a predetermined position.

Advantageously, the means for supporting the article comprises two clamp members adapted to engage opposite end walls of the article, and means for moving the clamp members towards one another to clamp the article between them and away from one another to release the article. The apparatus preferably includes a horizontal conveyor on which the articles are supplied to and discharged from the apparatus, and one of the clamp members is vertically reciprocable between a lowered position in which an article can be moved over it on the conveyor and a raised position in which the article is lifted from the conveyor and moved into engagement with the other clamp member.

The apparatus can thus be installed in a conveyor line to check each article as it passes along the conveyor line, the article being lifted from the conveyor, inspected, and deposited again on the conveyor. The apparatus may include means for deflecting from the conveyor any article for which the sensing means has detected a damaged chimb.

The apparatus may be made fully automatic in operation.

Figure 2:
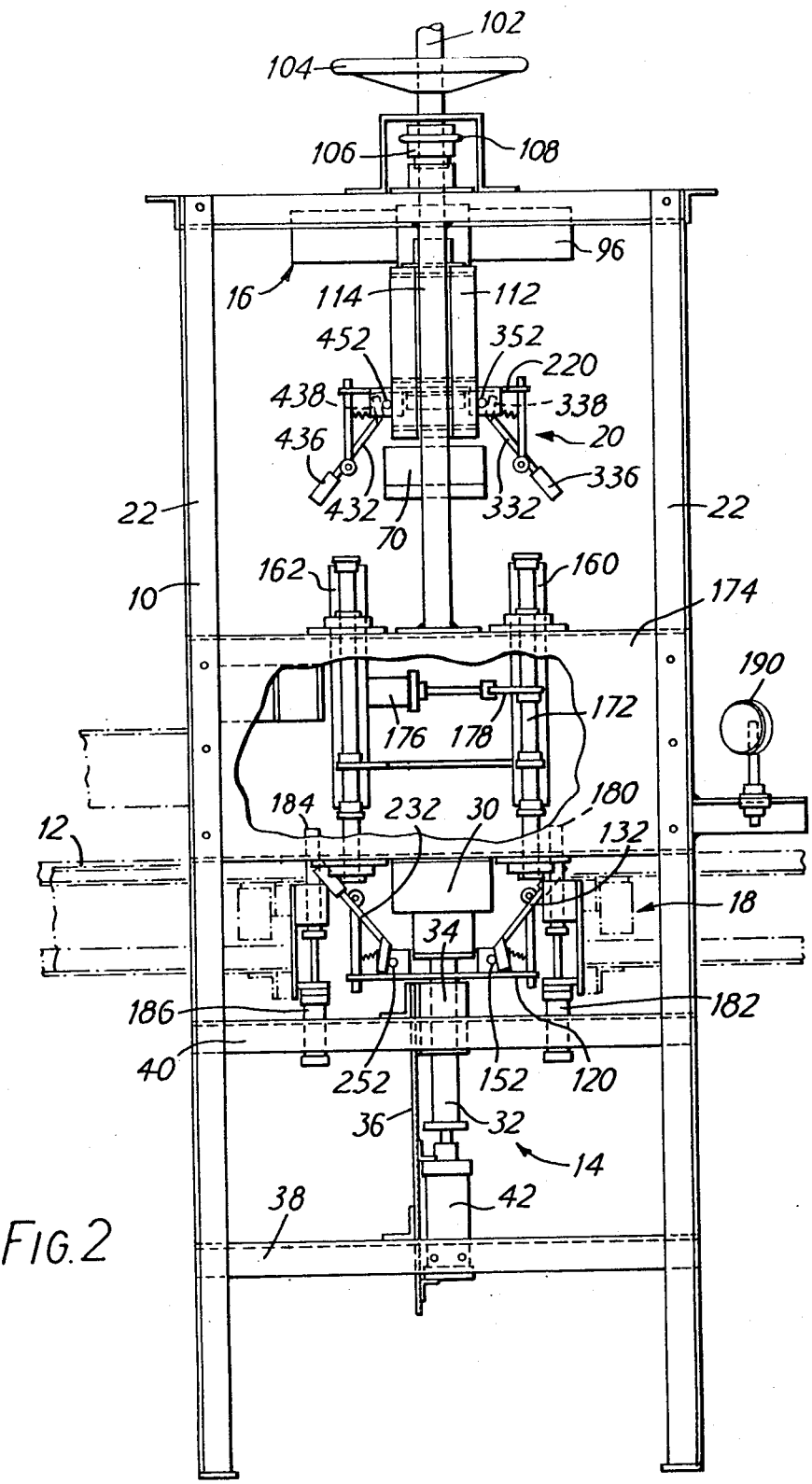
Figure 3:
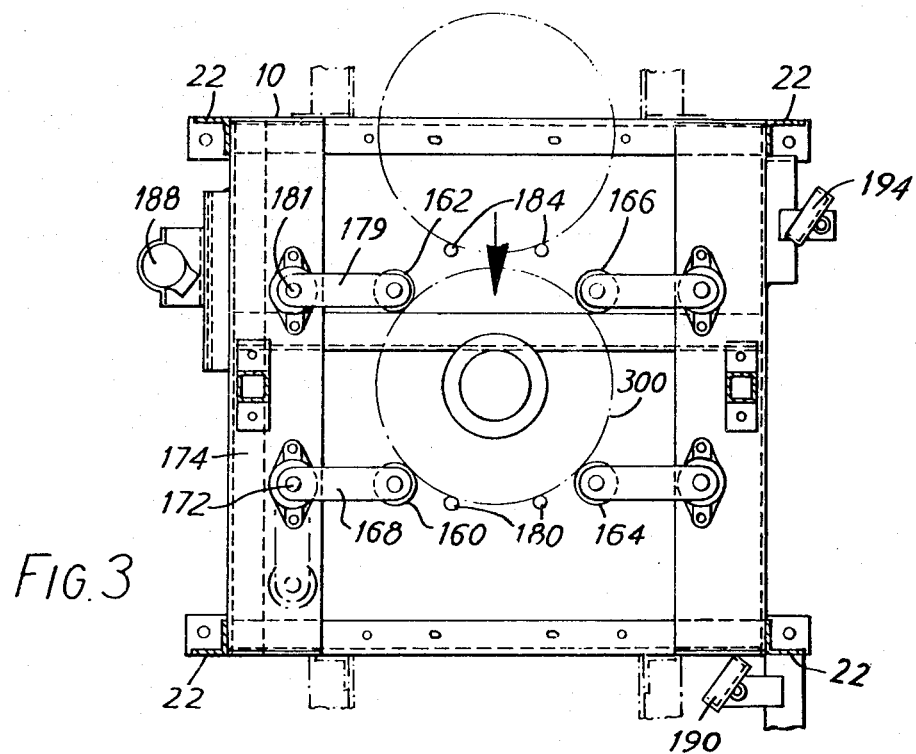
Figure 6:
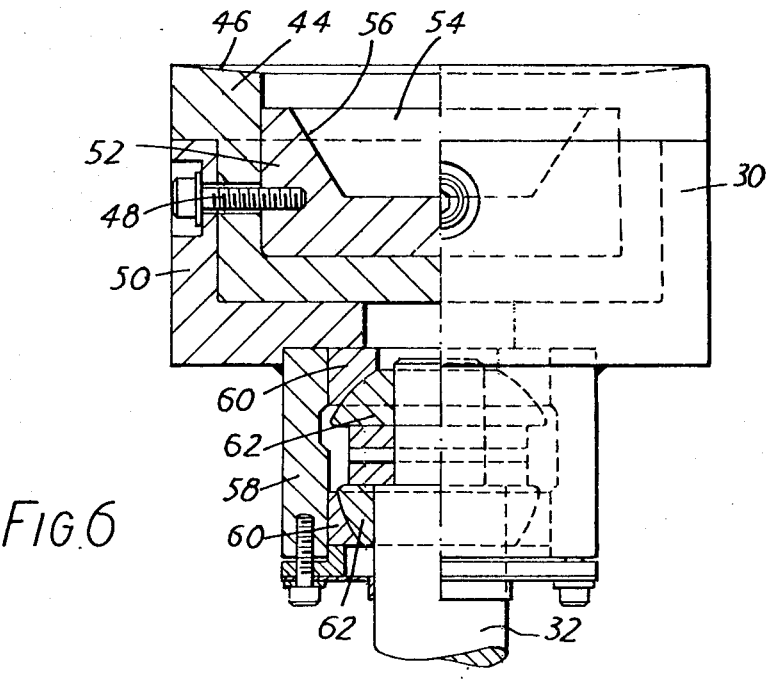
Figure 7:
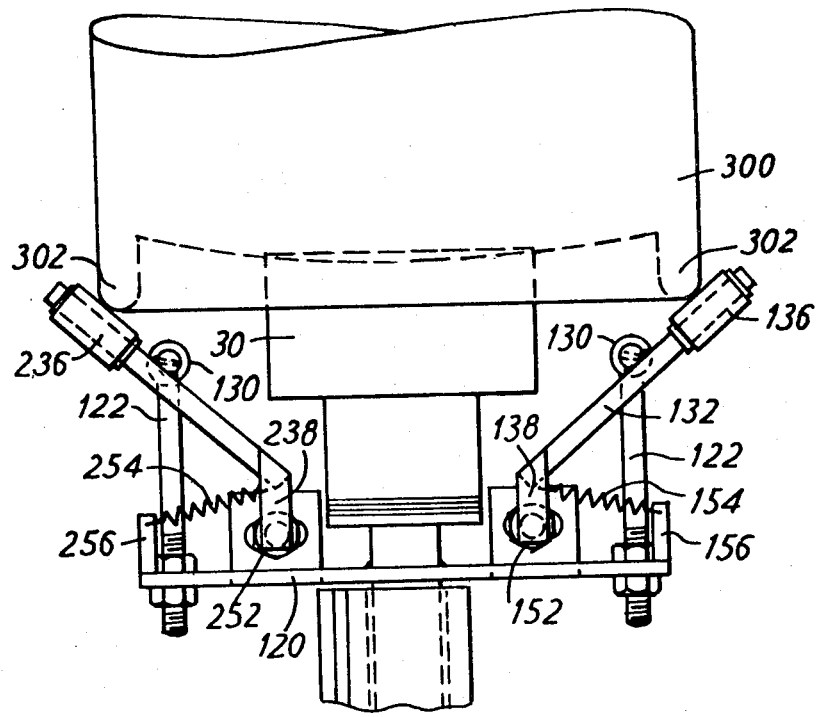
Figure 8:
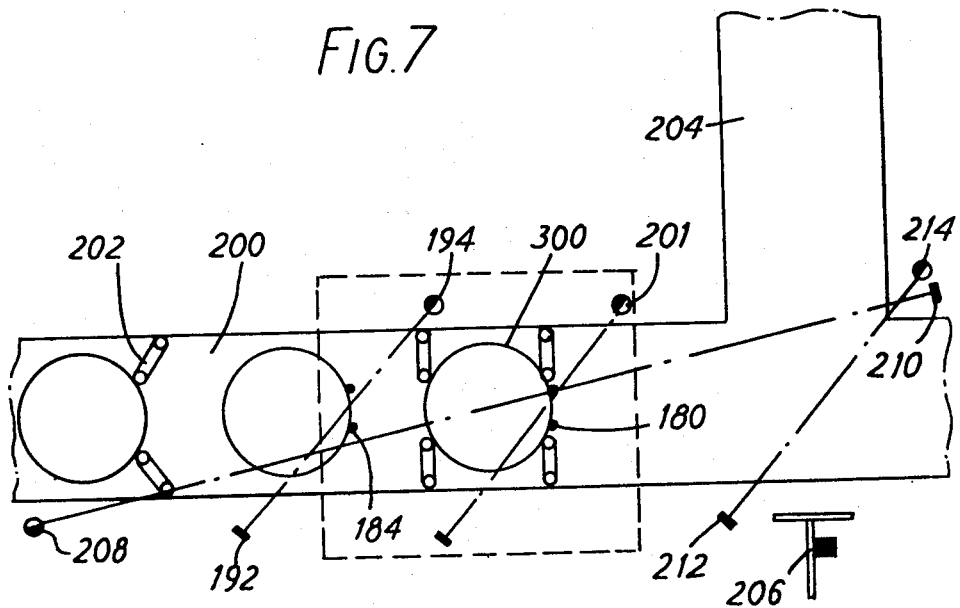

The invention will now be described, by way of example, with reference to the accompanying drawings, in which:

FIG. 1 is a front elevation of an apparatus in accordance with the invention for inspecting the chimbs of kegs, FIG. 2 is a side elevation of the apparatus, with part broken away, FIG. 3 is a cross-section on line III—III of FIG. 1, FIG. 4 is a side elevation, to a larger scale, of a lift unit and sensing unit of the apparatus, FIG. 5 is a front elevation of the lift unit and sensing unit of FIG. 4, FIG. 6 is an elevation, partly in section and to a still larger scale, of a lifting hub of the apparatus, FIG. 7 is a diagrammatic side elevation similar to FIG. 4 but showing sensing elements in engagement with the chimb of a keg, and FIG. 8 is a diagrammatic plan view showing the apparatus positioned in a conveyor line.

Referring to the drawings, apparatus for inspecting the chimbs of kegs or the like comprises a main frame 10, a horizontal conveyor section 12 passing through the main frame 10, a lift unit 14 for lifting a keg from the conveyor section 12, a drive unit 16 for rotating a keg lifted by the lift unit 14, and sensing units 18 and 20 for sensing the chimbs of the keg as it is rotated.

The main frame 10 consists of a rectangular framework of four uprights 22 and various cross-members. The conveyor section 12, which may be part of a conveyor line 200 (see FIG. 8), is a chain conveyor consisting of a pair of chains 24 extending between the pairs of uprights 22 and having a return run 26.

The lift unit 14 comprises a lifting hub 30 rotatably mounted at the upper end of a vertical shaft 32. The shaft 32 slides vertically in a guide boss 34 mounted on a plate 36 fixed to cross-members 38 and 40 of the main frame 10 and is movable by means of an air cylinder 42 mounted on plate 36 and having its piston rod connected to the lower end of the shaft 32. As shown in FIG. 6, the lifting hub 30 consists of a main hub part 44 of plastics material, such as polyurethane which is held by means of screws 47 between a steel mounting hub 50 and an inner steel hub 52 fitting into a recess in the main hub part 44. The main hub part 44 has an upwardly facing annular surface 46 shaped to engage the end face of a keg 100. The surface 46 may have a slightly dished shape corresponding to the bowed end face of the kegs to be handled. The inner hub 52 has a recess 54 to receive the neck of a keg (if the keg is fed to the apparatus in an inverted position). The recess 54 has a frusto-conical side wall 46 to guide the neck of the keg into the recess as the lifting hub moves into engagement with the keg. The mounting hub 50 has a collar 58 which houses bearing members 60 engaging co-operating bearing members 62 mounted at the end of shaft 32. The bearing members have part-spherical bearing surfaces so that the lifting hub 30 has some freedom of movement about horizontal axes, as well as being freely rotatable about a vertical axis, to ensure adequate engagement between the hub and the keg.

In the lowered position, as shown in FIG. 2, the lifting hub 30 is positioned just below the chains 24 of the conveyor section 12, so that a keg can be moved into position over the lifting hub. On actuation of the air cylinder 42 the hub 30 is raised between the chains 24.

The shaft 32 also carries the lower chimb sensing unit 18, which is described below.

The drive unit 16 comprises a driving hub 70 which is of similar construction to the lifting hub 30, having a main hub part 72 of plastics with an annular surface 74 adapted to engage the end face of a keg and a recess 76 to receive the neck of the keg (when kegs are fed in the upright position to the apparatus). The driving hub 70 is mounted on the lower end of a rotatable vertical shaft 82, by means of bearings which allow some freedom of movement of the hub 70 about horizontal axes but which constrain the hub 70 to rotate with the shaft 82. The shaft 82 is rotatably mounted, through bearings 84 and 86, on a support bracket 88 fixed to a subframe 90. A thrust bearing 87 is interposed between hub 70 and the sub-frame 90. The shaft 82 is connected at its upper end through a coupling 92 to the drive shaft 94 of a pneumatic torque actuator 96 of known form which can rotate the shaft 94 through 180° in either direction. A pair of inductive proximity detectors 98 are positioned on support bracket 88, one on either side of the shaft 82. Each detector 98 provides an output signal when a flange 100 on the shaft 82 is adjacent the detector, so that the detectors define two positions of the shaft 82 separated by 180° of rotation.

The sub-frame 90, which also carries the upper chimb sensing unit 20, is suspended from the main frame 10 by two screwthreaded shafts 102 and is adjustable in vertical position by means of a hand wheel 104 acting on a threaded boss 106 engaging one of the shafts 102 and, through a chain 108, on a threaded boss 110 engaging the other shaft 102. The position of the sub-frame is adjusted to suit the height of the kegs to be handled. The subframe 90 is held rigidly vertical by the sliding engagement of two polyethylene blocks 112, fixed to opposite ends of the sub-frame, with two vertical frame members 114 fixed to the main frame 10, each block 112 being formed with a channel which receives the co-operating frame member 114. Stop plates 116 and 118 fixed to the vertical members 114 are positioned to be engaged by the slide blocks 112 to define the lower and upper positions of the sub-frame 90, corresponding respectively to the shortest and tallest kegs to be handled.

The lower chimb sensing unit 18 comprises a horizontal mounting plate 120 welded to the shaft 32 just below the lifting hub 30. At each end of the plate is carried a vertical support column 122. Each column 122 has a lower threaded portion 124 which passes through a hole in the plate 120 and receives two lock nuts 126 and 128 by means of which the column is fixed to the plate. This method of fixing enables the vertical position of each column 122 relative to the plate 120 to be adjusted. Welded to the top of each support column 122 is a collar 130, fitted with an internal bush of phosphor bronze, which provides a pivot for an actuating arm 132 or 232. The right hand actuating arm 132 (as seen in FIG. 4), comprises a rod 134 carrying at its upper end a roller 136 and at its lower end a steel plate 138. A stub shaft 140 is welded to the rod 134 and extends at right angles to the rod. The stub shaft 140 fits into the collar 130 of the support column 122, so that the arm 132 can pivot about an axis which is horizontal and at right angles to a line joining the collar 130 to the axis of rotation of the lifting hub 30. The stub shaft is held in position by a split pin 142.

The roller 136 comprises a sleeve of plastics material such as polyethylene, positioned between a washer 144 welded to the rod 134 and a washer 146 retained by a split pin 148, so that the sleeve is freely rotatable on the rod 134. The steel plate 138 at the lower end of the arm 132 is welded to the rod 134 and is positioned so that as the arm 132 rotates the plate 138 moves over the sensing head 150 of an inductive proximity detector 152. A tension spring 154, connected between the plate 138 and a lug 156 welded to the support plate 120, biases the arm 132 to a position in which the plate 138 engages the support plate 120, as shown in FIG. 4. In this position, the plate 138 is clear of the proximity detector 152. Rotation of the arm 132, against the bias of spring 154, in the clockwise direction as seen in FIG. 4, moves the plate 138 towards the proximity detector 152. As shown in FIG. 5, the inductive proximity detector 152, which is of conventional form, is mounted on the support plate 120 by means of a lug 158, so that its head 150, containing a sensing coil, is close to the path of movement of the plate 138 on the arm 132.

The actuating arm 232 (on the left-hand side in FIG. 4) is constructed in a similar manner to the arm 132, having a freely rotatable roller 236 at its upper end and a steel plate 238 at its lower end. The arm 232 is pivoted on its support column 122, in a similar manner to the arm 132, so that rotation of the arm (in an anticlockwise direction as seen in FIG. 4) against the tension spring 254 moves the plate 238 from the rest position shown in FIG. 4 towards the sensing head 240 of an inductive proximity detector 252 mounted on the support plate 120.

The horizontal separation between the pivot axes of the actuating arms 132 and 232 is somewhat less than the overall diameter of the chimbs of the keg (see FIG. 5). The vertical positions of the pivot axes relative to the support plate 120 are adjusted, by adjusting the height of the support columns 122 as described, so that when a keg 300 is supported on the lifting hub 30, the lower chimb 302 of the keg engages the rollers 136 and 236 and moves them outwards, so that the actuating arms 132 and 232 are pivoted to positions in which the steel plates 138 and 238 are immediately adjacent the proximity detectors 152 and 252. During rotation of the keg, as described below, the rollers 136 and 236 ride against the chimb 302. If any part of the chimb is bent inwards, one of the actuating arms will pivot, under the bias of tension spring 154 or 254, as the roller rides over that part of the chimb, and the plate 138 or 238 will move away from the associated proximity detector. This movement of the plate is detected by circuitry connected to the proximity detector when the inner edge of the plate has moved beyond a predetermined distance from the detector. The position of the sleeve 136 or 236 at which the plate 138 or 238 reaches the predetermined distance can be varied by varying the height of the support column 122, so that the sensing unit can be adjusted to suit the particular chimb diameter of the kegs to be handled and also to adjust the sensitivity of the sensing unit. Thus, the unit can be adjusted so that movement of the actuating arms is detected only if part of the chimb is deformed more than a predetermined amount, say ½ inch, from its normal position.

The upper sensing unit 20 is similar in construction to the lower sensing unit 18, except that it is inverted as compared with the lower unit, so that it can act on the upper chimb 304 of the keg. Thus, the upper sensing unit 20 has two actuating arms 332 and 432 pivotally mounted at the lower ends of support columns 322. The actuating arms have freely rotatable rollers 336 and 436 at their lower ends and steel plates 338 and 438 at the upper ends, the plates moving across respective proximity detectors 352 and 452. Each of the actuating arms 332 and 432 is spring-biased to a position in which its plate 338 or 438 is clear of the respective proximity detector and can be rotated against the spring bias, by moving the roller 336 or 436 outwards, to move the plate towards the proximity detector. The support columns 322 are mounted on a support plate 220 in a similar manner to the support columns 122 of the lower sensing unit 20, so that the vertical positions of the pivot axes of the actuating arms 332 and 432 can be adjusted relative to the drive hub 70, to adjust the sensitivity of the sensing unit. The support plate 220, which also carries the proximity detectors 352 and 452, is fixed to the subframe 90 which supports the driving hub 70. The plate 220 is fixed to a bracket 221 which is vertically adjustable on the bracket 88, to provide another means of vertical adjustment of the actuating arms 332 and 432.

The apparatus is provided with two pairs of retractable guide rollers 160, 162, 164 and 166 (FIG. 3) to engage each keg 300 and ensure that its axis is aligned with the axis of rotation of the lifting hub 30 and drive hub 70. The roller 160 is rotatably mounted on a vertical shaft supported at the ends of two arms 168 and 170 which are fixed at their other ends to a vertical shaft 172. Shaft 172 is rotatably mounted in a support structure 174 fixed to the main frame 10 of the apparatus, so that the roller 160 can be moved between an operative position, shown in solid lines in FIG. 3, in which it can engage a keg 300, and a retracted position, shown in broken lines in FIG. 3, in which it is clear of the keg. The roller is moved from the retracted to the operative position by means of an air cylinder 176 acting on a lever 178 fixed to the shaft 172 so as to rotate the shaft. Roller 162 is similarly mounted on arms 179 fixed to a shaft 181, which is coupled to shaft 172 so that actuation of the air cylinder 176 causes the two shafts 172 and 181 to rotate in opposite directions to move the rollers 160 and 162 simultaneously between the retracted to the operative position. The other pair of guide rollers 164 and 166 are similarly mounted and provided with an air cylinder (not shown) to move them between retracted and operative positions.

A pair of retractable peg stops 180 are positioned to stop a keg at the appropriate position over the lifting unit 14 as the keg is moved into the apparatus on conveyor 12. The stops 180 can be lowered by the operation of an air cylinder 182 to allow kegs to be discharged from the apparatus. A further pair of retractable peg stops 184 are positioned on the upstream side of the lifting unit 14 to hold the next keg in position ready to be moved over the lifting unit as the preceding keg is discharged. The peg stops 184 are raised and lowered by means of an air cylinder 186.

As shown in FIG. 8, the apparatus is positioned in the conveyor line 200 along which the kegs travel. An escapement 202 is provided upstream of the apparatus to control the flow of kegs to the apparatus. Downstream of the apparatus a branch conveyor 204 extends from the conveyor line 200, forming a reject line to receive kegs having damaged chimbs which have been detected by the apparatus. A pusher 206 is provided to push rejected kegs onto the reject line. The escapement 202 conveyor 204 and pusher 206 may be of any well-known form and so are not described further.

To control the operation of the apparatus, various sensing devices may be provided. For example, a lamp 188 and photocell 190 are provided to sense the presence of a keg in position over the lifting unit 14. A lamp 192 (FIG. 8) and photocell 194 are provided to sense the presence of a keg at the upstream peg stop 184. A further lamp 208 and photocell 210 may be provided to sense the presence of a keg anywhere between the escapement 202 and the reject line 204, and a lamp 212 and photocell 214 are provided to sense the presence of a keg passing the pusher 206. To sense when the lifting hub 30 has been raised, a limit switch 196 is positioned so as to be actuated by a plate 198 fixed to the shaft 32.

In operation of the apparatus, the escapement 202 is normally open and is closed whenever a keg is present at the upstream peg stop 184, so that the escapement allows kegs one at a time to the apparatus. If no preceding keg is in position over the lift unit 14, peg stop 184 is retracted to allow the keg to move into position. The downstream peg stop 180 is raised as the keg is sensed by photocell 190, so that the keg is stopped over the lift unit. At the same time the upstream peg stop 184 is raised and the next keg released by the escapement 202. The roller guides 160, 162, 164 and 166 are moved into engagement with the keg and, after a predetermined delay, the air cylinder 42 is actuated to raise the lifting hub 30. The hub 30 engages the keg 30 and lifts it, so that the upper wall of the keg moves into engagement with the drive hub 70. During this movement the rollers 136, 236, 336 and 436 of the lower and upper sensing units 18 and 20 are engaged by the chimbs of the keg, as described above. The torque actuator 96 is energised to rotate the drive hub 70 thereby to rotate the keg through 180°. During this rotation, any excessive deformation of one or other of the chimbs of the keg will cause one or more of the proximity detectors 152, 252, 352 and 452 to detect the corresponding movement of one of the actuating arms and to provide a signal to control circuitry of the apparatus. When the 180° rotation of the keg has been completed, as sensed by one of the proximity detectors 98, the lifting hub 30 is lowered to deposit the keg onto the conveyor 12. The guide rollers 160, 162, 164, 166 are then opened and the peg stop 180 lowered to allow the keg to move out of the apparatus on conveyor 12. The upstream peg stop 184 is lowered to allow the next keg into position over the lifting unit 14 and the process is repeated. If either or both of the sensing units 18 and 20 have sensed a damaged chimb, then the control circuitry is set so that as the keg reaches a position adjacent the pusher 206, as sensed by the photocell 214, the pusher is actuated to deflect the keg onto the reject line 204. Damaged kegs are thus automatically removed from the conveyor line 200.

It will be appreciated that modifications could be made in the described embodiment. For example, the inductive proximity detectors in the sensing units could be replaced with other sensing elements, such as photoelectric sensors. Various different arrangements could be made to separate damaged kegs from sound ones after discharge from the apparatus, in place of the described arrangement of pusher and reject line.

I claim:

1. Apparatus for inspecting the chimbs of cylindrical articles such as kegs, comprising means for supporting such an article, two sensing means arranged simultaneously to engage respective chimbs at opposite ends of the article, each said sensing means having at least one sensing element arranged to engage said chimb at a point in its circumference and adapted to detect a displacement of the chimb at that point from a predetermined position, and drive means for effecting relative rotation about the axis of the article between the article and the sensing means so that each point on the circumference of the chimb passes the sensing element or one of the sensing elements during the rotation.

2. Apparatus as claimed in claim 1, in which the or each sensing means includes two sensing elements arranged to engage diametrically opposite points on the chimb, and the drive means is adapted to effect relative rotation through 180° between the article and the sensing elements.

3. Apparatus for inspecting the chimbs of cylindrical articles such as kegs, comprising means for supporting such an article, sensing means having at least one sensing element arranged to engage a chimb of the article at a point in its circumference and adapted to detect a displacement of the chimb at that point from a predetermined position, and drive means for effecting relative rotation about the axis of the article between the article and the sensing means so that each point on the circumference of the chimb passes the sensing element or one of the sensing elements during the rotation, in which the means for supporting the article comprises two rotatable clamp members adapted to engage opposite end walls of the article, and means for moving the clamp members towards one another to clamp the article between them and away from one another to release the article, and in which the drive means comprises means for rotating at least one of the clamp members thereby to rotate an article clamped between them.

4. Apparatus as claimed in claim 3, in which there is provided a horizontal conveyor on which the articles are supplied to and discharged from the apparatus, and one of the clamp members is vertically reciprocable between a lowered position in which an article can be moved over it on the conveyor and a raised position in which the article is lifted from the conveyor and moved into engagement with the other clamp member.

5. Apparatus as claimed in claim 4, in which the lower clamp member is rotatably mounted in a vertically reciprocable support structure, and the sensing means include sensing elements mounted on the support structure so as to be reciprocable with the clamp member.

6. Apparatus as claimed in claim 5, in which the vertical position of the upper clamp member is adjustable to accommodate articles of different heights.

* * * * *